(12) United States Patent
Warburton et al.

(10) Patent No.: US 11,558,350 B2
(45) Date of Patent: *Jan. 17, 2023

(54) LOCALIZATION AT SCALE FOR A CLOUD-BASED SECURITY SERVICE

(71) Applicant: Palo Alto Networks, Inc., Santa Clara, CA (US)

(72) Inventors: Thomas Arthur Warburton, San Jose, CA (US); Shu Lin, Saratoga, CA (US); Devendra Raut, Saratoga, CA (US); Jialiang Li, Sunnyvale, CA (US); Hao Long, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/120,047

(22) Filed: Dec. 11, 2020

(65) Prior Publication Data

US 2022/0045987 A1 Feb. 10, 2022

Related U.S. Application Data

(63) Continuation of application No. 16/985,050, filed on Aug. 4, 2020, now Pat. No. 10,911,407.

(51) Int. Cl.
*H04L 29/06* (2006.01)
*H04L 9/40* (2022.01)

(52) U.S. Cl.
CPC ........ *H04L 63/0236* (2013.01); *H04L 63/029* (2013.01); *H04L 63/20* (2013.01)

(58) Field of Classification Search
CPC .................................................. H04L 63/0236
See application file for complete search history.

(56) References Cited

U.S. PATENT DOCUMENTS

| 9,935,984 | B1* | 4/2018 | Castilho .................. H04L 63/10 |
| 10,027,624 | B1 | 7/2018 | Salour |
| 10,419,394 | B2 | 9/2019 | Chou |
| 10,547,679 | B1 | 1/2020 | Burnett |
| 10,594,651 | B1 | 3/2020 | Salour |

(Continued)

FOREIGN PATENT DOCUMENTS

| CN | 103532752 | 1/2014 |
| CN | 111095876 | 5/2020 |

(Continued)

OTHER PUBLICATIONS

Author Unknown, Network Edge Locations, VPC, Google Cloud, downloaded Jul. 28, 2020.

(Continued)

*Primary Examiner* — Bradley W Holder
(74) *Attorney, Agent, or Firm* — Van Pelt, Yi & James LLP

(57) ABSTRACT

Techniques for providing localization at scale for a cloud-based security service are disclosed. In some embodiments, a system/method/computer program product for providing localization at scale for a cloud-based security service includes receiving a connection request at a network gateway of a cloud-based security service; performing a source Network Address Translation (NAT) from a registered set of public IP addresses associated with a tenant; and providing secure access to a Software as a Service (SaaS) using the cloud-based security service.

20 Claims, 8 Drawing Sheets

(56) References Cited

U.S. PATENT DOCUMENTS

| | | | |
|---|---|---|---|
| 2012/0173731 A1 | 7/2012 | Lin | |
| 2014/0137244 A1 | 5/2014 | Banerjee | |
| 2014/0189092 A1 | 7/2014 | Zhang | |
| 2014/0330782 A1 | 11/2014 | Abuelsaad | |
| 2015/0005011 A1 | 1/2015 | Nehrenz | |
| 2015/0058749 A1* | 2/2015 | Hwu | H04L 67/52 709/204 |
| 2015/0201304 A1 | 7/2015 | Tasdemiroglu | |
| 2016/0105489 A1 | 4/2016 | Llorca | |
| 2016/0248812 A1* | 8/2016 | Desai | H04L 63/1441 |
| 2018/0115514 A1 | 4/2018 | Chou | |
| 2018/0268153 A1* | 9/2018 | Zellner | H04L 67/52 |
| 2019/0104063 A1 | 4/2019 | Cidon | |

FOREIGN PATENT DOCUMENTS

| | | |
|---|---|---|
| JP | 2017532660 | 11/2017 |
| WO | 2019109809 | 6/2019 |
| WO | 2019195010 | 10/2019 |

OTHER PUBLICATIONS

Google, Google The Keyword, Google Cloud, Espresso Makes Google Cloud Faster, More Available and Cost Effective by Extending SDN to Public Internet, Jul. 24, 2020.

Zscaler, Zia, About Public Service Edges, downloaded Jul. 29, 2020.

Zscaler, Zia, About the ZIA Cloud Architecture, downloaded Jul. 29, 2020.

\* cited by examiner

LOCALIZATION AT SCALE FOR A CLOUD-BASED SECURITY SERVICE

CROSS REFERENCE TO OTHER APPLICATIONS

This application is a continuation of U.S. patent application Ser. No. 16/985,050, entitled LOCALIZATION AT SCALE FOR A CLOUD-BASED SECURITY SERVICE filed Aug. 4, 2020, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
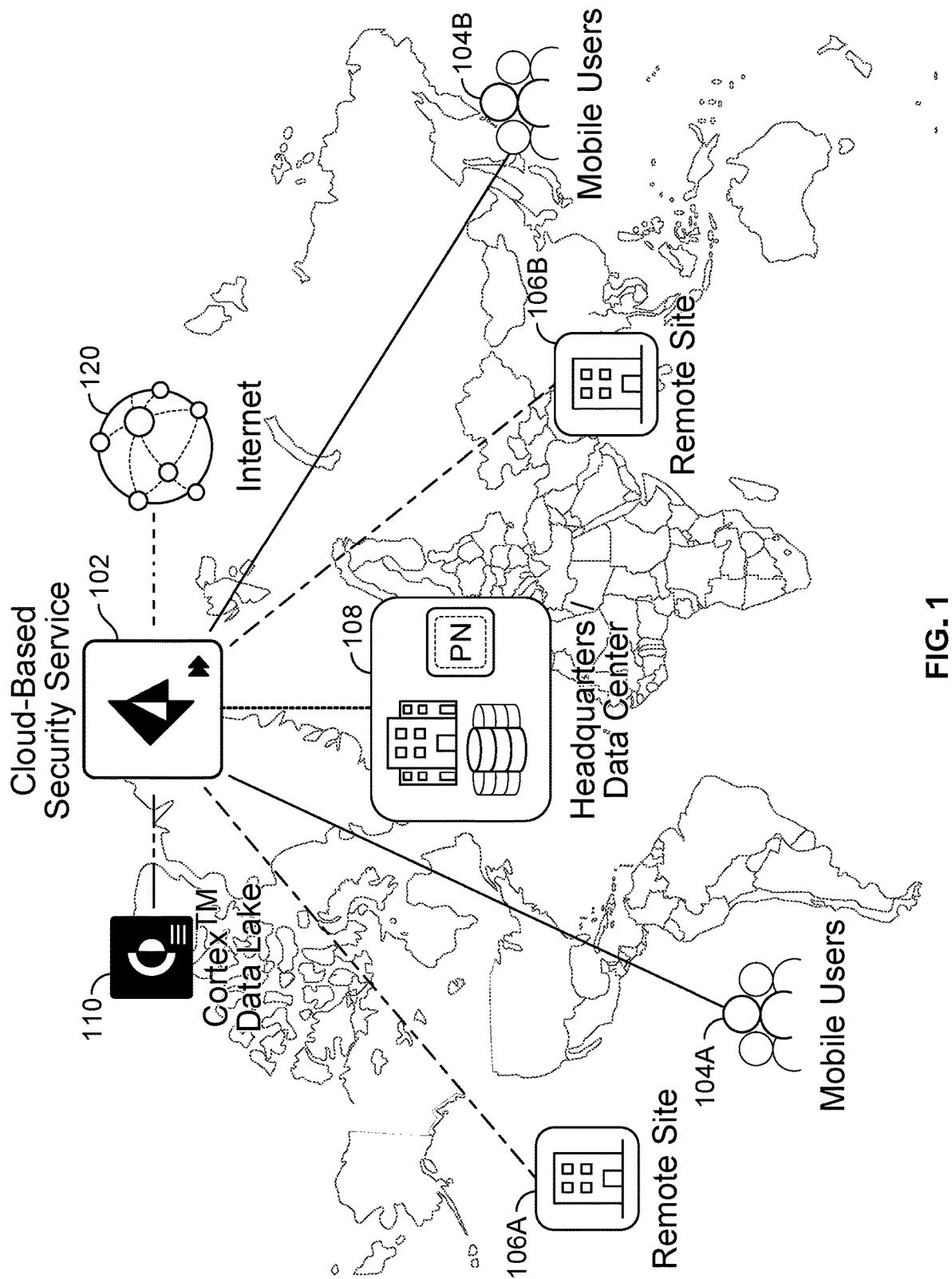
FIG. 1 is a system diagram overview of an example cloud-based security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Cloud-Based Security Service Providers

Security service providers offer various commercially available cloud-based security solutions including various firewall, VPN, and other security related services. For example, some security service providers have their own data centers in multiple geographies across the world to provide their customers such cloud-based security solutions.

Generally, cloud-based security services are offered by cloud-based security service providers in different locations/regions around the world. However, customers (e.g., enterprise customers of a given cloud-based security service provider) may have offices and/or mobile users in certain locations/regions that such cloud-based security service providers do not have data centers for providing such customers with their cloud-based security services. As a result, this often introduces a network performance latency for many customers outside of the locations/regions that the cloud-based security service provider has a local data center.

Moreover, the cloud-based security service provider may not provide adequate support for localization for those locations/regions that the cloud-based security service provider does not have a local data center. Specifically, many web sites/services determine the localization package (e.g., display language/content) based on the location of users, which is primarily determined by the registered location of the user's IP address. As such, if user traffic egresses from a network gateway of a cloud-based security service, then the public IP address associated with that network gateway typically becomes the source IP address of that user traffic. Given that the public IP address associated with the network gateway of the cloud-based security service in this example would not be registered in the same geography (geo) location as the user's actual location, the web sites/services will typically display the language/content that is different from the actual location of the user, which is generally a less desirable user experience for such customers of the cloud-based security service provider.

For example, if a user located in France is connected to a network gateway of the cloud-based security service provider in Germany (e.g., as the security service provider does not have a data center located in Italy and their nearest network gateway is located in Germany), then the web sites/services would treat the user's session as if the user is located in Germany as that user's session is given an egress IP address of that network gateway, which would be associated with a public IP address registered in Germany. As a result, this generally results in a less desirable user experience for that user (e.g., and other users of the security service provider who are located in locations/regions that the security service provider does not have a network gateway/data center).

Thus, what are needed are new and improved techniques for providing localization for a cloud-based security service.

Techniques for Providing Localization at Scale for a Cloud-Based Security Service Accordingly, various techniques for providing localization at scale for a cloud-based security service are disclosed.

The disclosed techniques are based on an observation that, for example, in the public cloud, the IP address location/region and the instance location/region are generally irrelevant. Hence, the disclosed techniques effectively decouple the location/region (e.g., city, state, county, district, province, country, and/or continent) of a given network gateway (e.g., a physical network gateway or a virtual instance of such a network gateway of the cloud-based security service provider) and the geo location associated with the IP address(es) associated with that given network gateway.

For example, if a given cloud-based security provider's network gateway located in Belgium is associated with a United States (US)-based IP address, then its egress traffic is treated as traffic from the US by web sites/services available on the Internet (e.g., a Software as a Service (SaaS) provider site or any other web site/service on the Internet).

In contrast, if user traffic of a given user's session of a user located in the Netherlands is egressed from that network gateway in Belgium, but, in this example, the egress IP address is actually a Netherlands-based IP address, then the web sites/services would infer that the user is located in the Netherlands based on that egress IP address, thereby providing a more desirable locality experience for the user in the Netherlands regardless of the physical location of the network gateway of the cloud-based security provider. As an example, if the web site/service is the Microsoft Office 365® service, then the Microsoft Office 365® service can provide an appropriate Netherlands-based locality experience for the user (e.g., selecting the appropriate language packages for the SaaS for that Netherlands-based user, etc.).

In some embodiments, a system/method/computer program product for providing localization at scale for a cloud-based security service includes receiving a connection request at a network gateway of a cloud-based security service; performing a source Network Address Translation (NAT) from a registered set of public IP addresses associated with a tenant; and providing secure access to a Software as a Service (SaaS) using the cloud-based security service.

For example, the disclosed cloud-based security service provides users with an enhanced locality user experience as will be further described below. The disclosed cloud-based security service also provides an enhanced security solution for the users as the registered sets of public IP addresses are distinct for each tenant (e.g., customer) of the cloud-based security service as will also be further described below.

In some embodiments, the system/method/computer program product for providing localization at scale for a cloud-based security service further includes providing the cloud-based security service using a public cloud service provider (e.g., a cloud-based computing service, such as the Google Cloud Platform® (GCP), or other public cloud service providers that offer similar solutions, which may include Amazon Web Services® (AWS), Microsoft Azure® services, etc., and/or various combinations of such cloud-based computing services and/or data centers controlled by the cloud-based security service provider) that provides high-speed network connectivity from each of their various regional cloud-based computing service data centers to one or more SaaS providers. As a result, users of the cloud-based security service also experience lower latency when using such SaaS provider solutions thereby further enhancing the user experience as well as security when using such SaaS provider solutions via the cloud-based security service.

In an example implementation, to leverage the advantages of a public cloud service provider, the cloud-based security service utilizes the Google public cloud service (e.g., the commercially available Google Cloud Platform (GCP) service currently has 100+ points of presence (PoPs) globally, see https://cloud.google.com/vpc/docs/edge-locations) and implements the disclosed techniques for enhanced user experience of locality for web sites/services, such as will be further described below. Also, implementing the cloud-based security service using one or more public cloud services enhances the flexibility and scale of the cloud-based security service (e.g., as opposed to only using the cloud-based security service provider's regional data centers, which may not cover as many regions worldwide, may not have as much computing resources for scaling as compared with many of public cloud service providers, and/or may not have high-speed network connectivity from each of their various regional cloud-based computing service data centers to one or more SaaS providers).

In this example implementation, the network gateways of the cloud-based security service provider implement the disclosed techniques for enhanced user experience of locality for web sites/services by performing a Source NAT (SNAT) operation on incoming user sessions that are connecting to sites outside of the user's enterprise network to access a web site/service on the Internet. Specifically, such user sessions are assigned an IP address that is associated with the location/region of the user's incoming session to the network gateway as opposed to an IP address that is assigned to the network gateway that may be located in a different location/region and/or that network gateway IP address is associated with a location/region that is distinct from the user's location/region.

In this example implementation, the cloud-based security service provider also maintains a set of IP address ranges for each of their supported locations/regions (e.g., PoPs) to use as distinct public IP address pools for each customer/tenant of the cloud-based security service provider's service (e.g., as opposed to requiring that each of their customers provide, for example, hundreds of such public IP address ranges).

Also, by maintaining such public IP address pools distinct for each customer/tenant, the cloud-based security service provider also facilitates a more secure solution for each of their customers (e.g., as opposed to having such a public IP address pool that is shared across distinct customers) as well as facilitating the localization at scale benefits of the disclosed techniques (e.g., by supporting such techniques at hundreds of PoPs). For example, customers can utilize the distinct public IP address pool to implement various security policies (e.g., ACME Company can allow user sessions connecting to their Salesforce® service to bypass multifactor authentication based on the assigned public IP address of the user sessions given that the cloud-based security service provider utilizes a public IP address pool that is distinct and only used for users associated with the ACME Company).

In one embodiment, the network gateway of the cloud-based security service provider (e.g., the PAN-OS operating system of Palo Alto Networks' firewalls) is configured to support the disclosed new NAT capability (e.g., SNAT operations) for providing localization at scale for a cloud-based security service as will be further described below.

As such, the disclosed techniques for providing localization at scale for a cloud-based security service facilitate an enhanced local experience for users. For example, users of the cloud-based security service can utilize various SaaS applications and/or Internet web sites/services and such will be rendered/provided in the local language associated with the user's location as opposed to a network gateway of the cloud-based security service that is used to connect that user to the cloud-based security service (e.g., which may be in a different geo location/region from that user as similarly described above).

Accordingly, various techniques for providing localization at scale for a cloud-based security service are disclosed as will now be further described below.

System Processing Architectures for Providing Localization at Scale for a Cloud-Based Security Service In some embodiments, the cloud-based security service is implemented using one or more public cloud solutions to provide greater scale and worldwide coverage (e.g., providing data centers in a greater number of regions, such as hundreds of PoPs as similarly described above). For example, as an enterprise customer's business expands globally with new remote network locations popping up around the globe and mobile users roaming the world, it can be challenging to ensure that an enterprise customer's users, data centers, and remote sites remain connected and secure.

As such, using the disclosed techniques the cloud-based security service can be implemented using a cloud-based infrastructure, allowing the cloud-based security service provider to avoid the challenges of, for example, sizing firewalls and compute resource allocations as well as minimizing coverage gaps or inconsistencies associated with an enterprise's often distributed organization. Moreover, the elasticity of the public cloud efficiently scales as demand shifts and traffic patterns change. As such, the cloud-based security service can operationalize next generation security deployment to remote networks and mobile users by leveraging such a cloud-based security infrastructure managed by the cloud-based security service provider.

For example, the security processing nodes (e.g., network gateways, which can be implemented using commercially available security platform solutions, such as the various firewalls available from Palo Alto Networks, Inc.) can be deployed within the service natively to inspect all traffic in order to identify applications, threats, and content. Also, the cloud-based security service can provide visibility into the use of SaaS applications and the ability to control which SaaS applications are available to the enterprise customer's users (e.g., including access, control, and other security related policies, such as MultiFactor Authentication (MFA) requirements based on a session's IP address as similarly described above). As such, the cloud-based security service can deploy and manage the security infrastructure globally to secure, for example, the enterprise customer's data centers, headquarters, remote sites (e.g., branch offices and remote networks), and mobile users.

FIG. 1 is a system diagram overview of an example cloud-based security service in accordance with some embodiments. In this example cloud-based security service shown at 102, various mobile users 104A and 104B, remote sites 106A and 106B (e.g., to secure remote network locations, such as branch offices and remote networks, and users in those branches with cloud-based next-generation firewalls), as well as a headquarters/data center 108 of an enterprise customer(s) are in communication with the cloud-based security service. A data store 110 (e.g., a Cortex™ Data Lake or another data store solution) is also in communication with the cloud-based security service for storing various logs and/or other information for the cloud-based security service.

For example, the cloud-based security service can provide various firewall, VPN (e.g., establishing IPsec tunnels using one or more IP address pools to allow the service to assign IP addresses for the client VPN tunnels to facilitate secure communication between, for example, internal resources in the customer's enterprise network, the enterprise customer's mobile users, and users in their remote network/site locations), and other security related services for the mobile users, remote sites, and headquarters/data center based on policies (e.g., security policies configurable by the enterprise customer), such as for secure access to web sites/services (e.g., including SaaS provider services) on the Internet shown at 120.

Figure 2A:
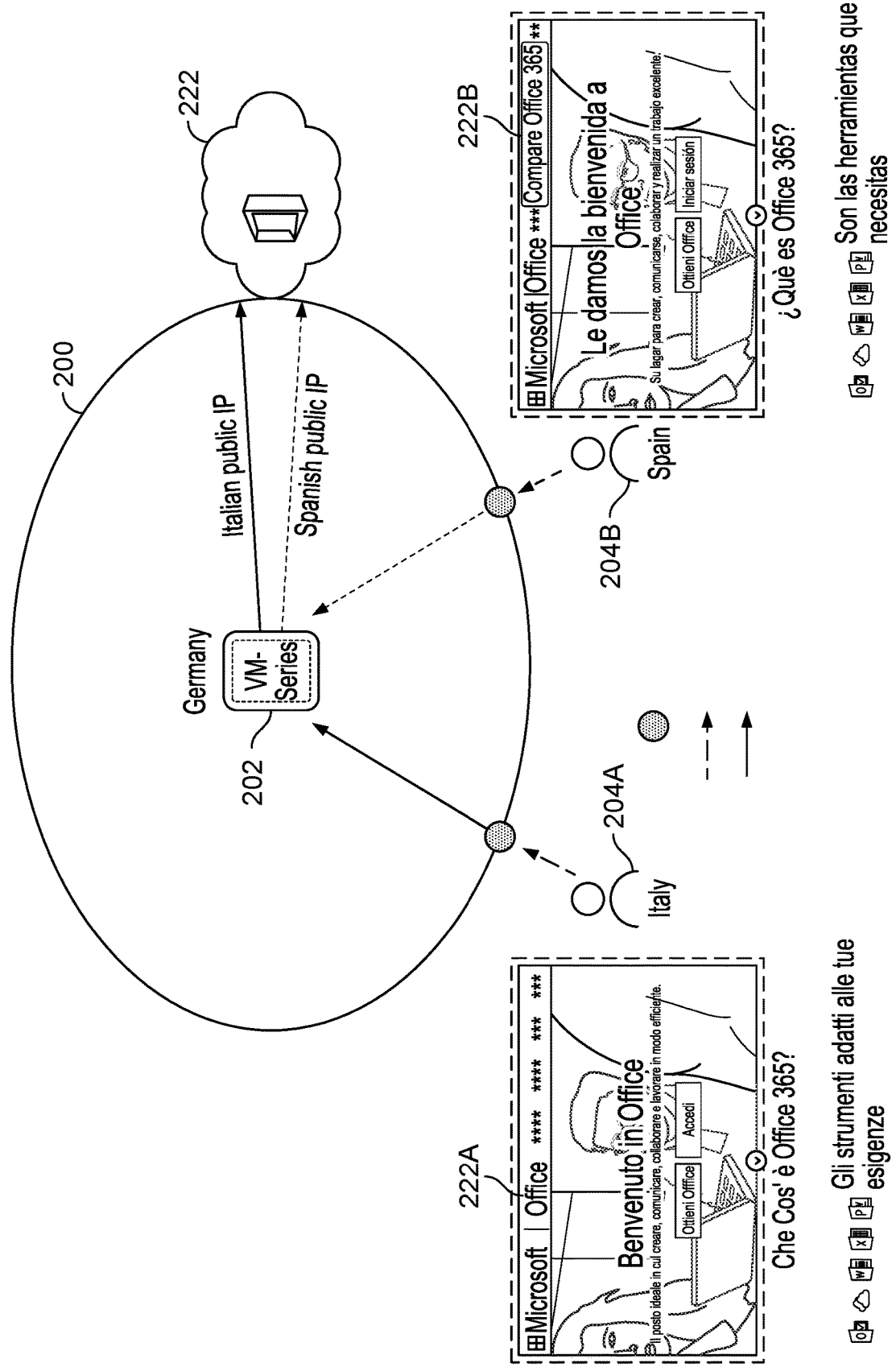
FIG. 2A is a system diagram of an example cloud-based security service in accordance with some embodiments.

FIG. 2A is a system diagram of an example cloud-based security service in accordance with some embodiments. For example, a cloud-based security service 200 can be implemented using a commercially available public cloud solution, such as the Google Cloud Platform (GCP), to facilitate a low latency for supported SaaS providers (e.g., Microsoft Office 365® as shown and/or other supported SaaS providers, such as Salesforce®, etc.) as well as implement the disclosed techniques for an enhanced local experience for users of the cloud-based security service when they are connecting to web sites/services on the Internet including such SaaS provider solutions available on the Internet. As will be apparent to one of ordinary skill in the art, the disclosed techniques can similarly be implemented using public cloud solutions that are commercially available from other public cloud service providers, a combination of various public cloud service providers, or also by using regional data centers maintained/controlled by the cloud-based security service provider, or any combination thereof.

Referring to FIG. 2A, a network gateway 202 of cloud-based security service 200 is implemented as a virtual network gateway 202 (e.g., a security platform, such as a firewall solution available from Palo Alto Networks, Inc., or another commercially available security platform solution can similarly be configured to implement the network gateway as disclosed herein) executing on a server in a data center. In this example, the network gateway is executed on a server in a data center of the GCP located in Germany. A user 204A, who is located in Italy, is securely connected (e.g., via an IPsec tunnel or another secure/Virtual Private Network (VPN) connection) to network gateway 202 that is located in Germany (e.g., the cloud-based security service provides an agent that is executed on the endpoint device of user 204A to automatically and securely connect the user to the nearest regional network gateway, in which the enterprise customer can, for example, select locations in the cloud-based security service that function as cloud-based network gateways to secure their mobile users, such as will be further described below). Similarly, a user 204B, who is located in Spain, is securely connected to network gateway 202 that is located in Germany. In an example implementation, the cloud-based security service also provides an agent (not shown) (e.g., an endpoint agent, such as the GlobalProtect agent available from Palo Alto Networks, Inc.) that can be executed on various computing platforms such as the endpoint devices (e.g., endpoint devices executing various Operating Systems (OSs), such as Linux OS, Microsoft Windows® OS, Apple Mac OS®, Apple iOS®, and Google Android® OS) of users 204A and 204B (e.g., as well as of other users and data appliances, servers, etc.) that facilitates such automatic and secure connections to the nearest gateway and/or based on other criteria (e.g., latency, workload balancing, etc.).

As shown in FIG. 2A, using the disclosed techniques, network gateway 202 automatically performs a Source NAT (SNAT) operation to assign an Italian public IP address (e.g., a public IP address that is associated with the geo location of Italy) as the egress IP address to be associated with the session for user 204A when connecting with the Microsoft Office 365® service shown at 222. Similarly, network gateway 202 automatically performs a SNAT operation to assign a Spanish public IP address (e.g., a public IP address that is associated with the geo location of Spain) as the egress IP address to be associated with the session for user 204B when connecting with the Microsoft Office 365® service shown at 222.

As shown at 222A and 222B, users 204A and 204B of the cloud-based security service can connect through network gateway 202 to access various SaaS applications, such as Microsoft Office 365® (e.g., and/or other Internet web sites/services), and such will be rendered/provided in the local language associated with each user's respective location as a result of the above-described SNAT operations performed by network gateway 202 (e.g., absent such SNAT operations, the SaaS applications such as Microsoft Office 365® would infer that the users are located in Germany based on the public IP address(es) associated with network gateway 202 that is located in Germany (e.g., a public IP address(es) that is associated with the geo location of Germany), which would not provide a desirable user localization experience).

Moreover, the public cloud provider, GCP in this example, provides high-speed network connectivity from each of their various regional cloud-based computing service data centers to one or more SaaS providers including Microsoft Office 365® (e.g., using the GCP premium network that utilizes Google-owned fiber network connections from their regional cloud platform sites to various SaaS provider sites). As a result, users 204A and 204B of cloud-based security service 200 would also experience a lower latency when connecting to network gateway 202 to access such SaaS provider solutions (e.g., Microsoft Office 365®), thereby further enhancing the user experience when using the SaaS provider solution securely via the cloud-based security service.

Figure 2B:
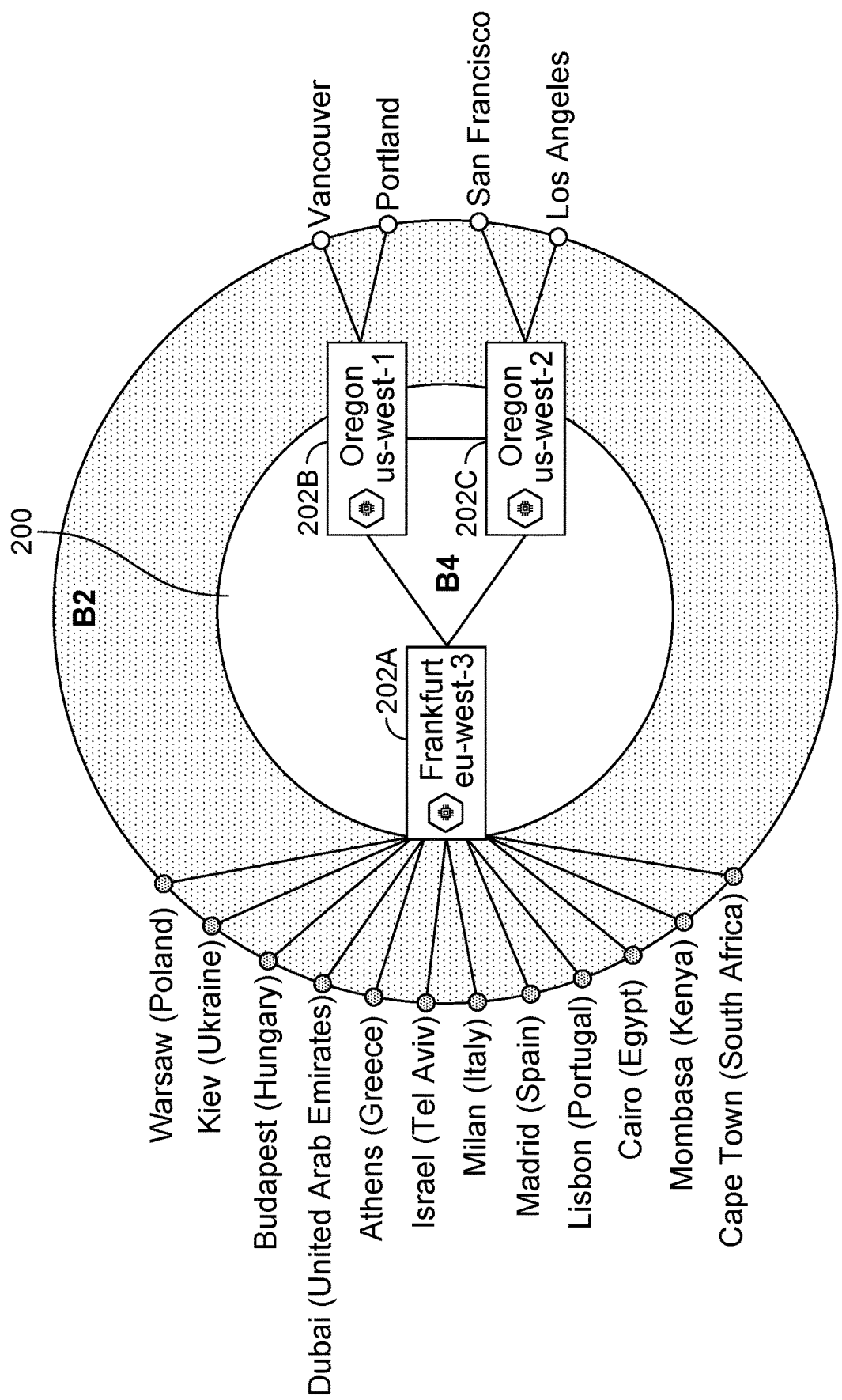
FIG. 2B is another system diagram of an example cloud-based security service in accordance with some embodiments.

FIG. 2B is another system diagram of an example cloud-based security service in accordance with some embodiments. In this example, network gateways 202A, 202B, and 202C of a cloud-based security service 200 are located in different geo locations as shown. As also shown, users of the cloud-based security service that are each located in different locations/regions can be automatically and securely connected to a network gateway of the cloud-based security service provider, such as further described below. For example, users located in Warsaw (Poland) are connected to a network gateway 202A in an eu-west-3 data center located in Frankfurt, Germany; users located in Vancouver, Canada are connected to a network gateway 202B in a us-west-1 data center located in Oregon, United States; and users located in San Francisco, Calif. are connected to a network gateway 202C in a us-west-2 data center also located in Oregon, United States. In an example implementation, the cloud-based security service can be implemented using a public cloud platform, such as GCP, that currently provides over 130 network edge locations (PoPs), and also provides for a low latency, low loss network with reduced Internet Service Provider (ISP) hops for users of the cloud-based security service to access various supported SaaS solutions as similarly described above.

In one embodiment, the disclosed network gateways (e.g., network gateway 202 of FIG. 2A and network gateways 202A-C of FIG. 2B) are configured to enforce policies (e.g., security policies) regarding communications between client devices and between client devices and servers/other devices, such as users/devices 204A and 204B (e.g., any endpoint device that can perform network communications) and, for example, external destinations (e.g., which can include any devices, servers, and/or web sites/services outside of a protected/secured enterprise network, which are reachable via an external network, such as the Internet). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, etc. In some embodiments, the network gateway is also configured to enforce policies with respect to traffic that stays within a protected/secured enterprise network (not shown in FIGS. 2A and 2B).

Figure 3A:
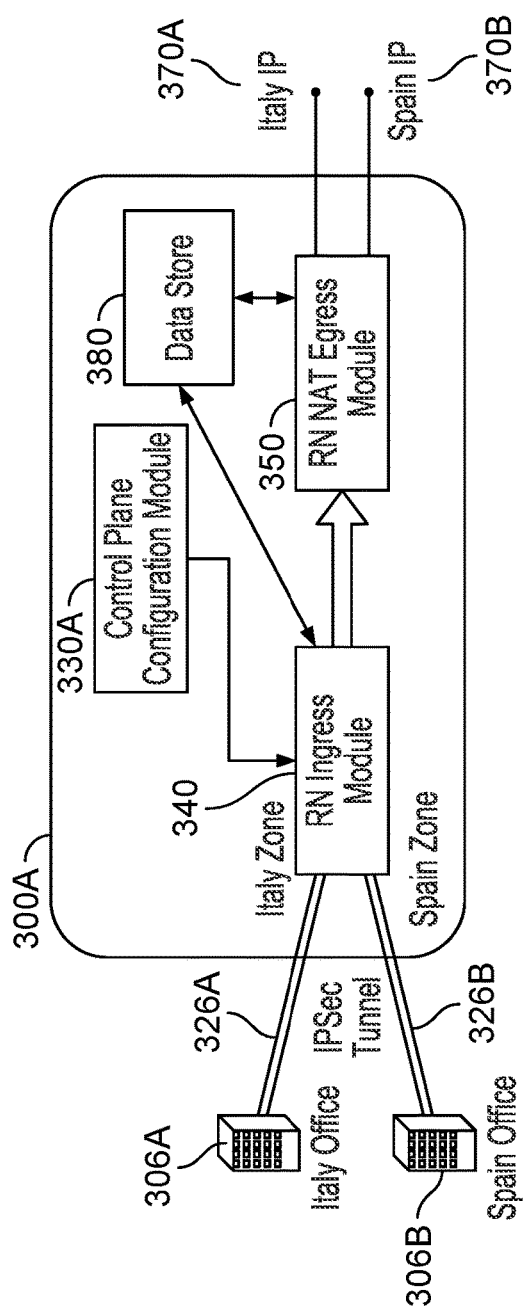
FIGS. 3A and 3B are system block diagrams that illustrate example components of a network gateway for providing localization at scale for a cloud-based security service in accordance with some embodiments.
Figure 3B:
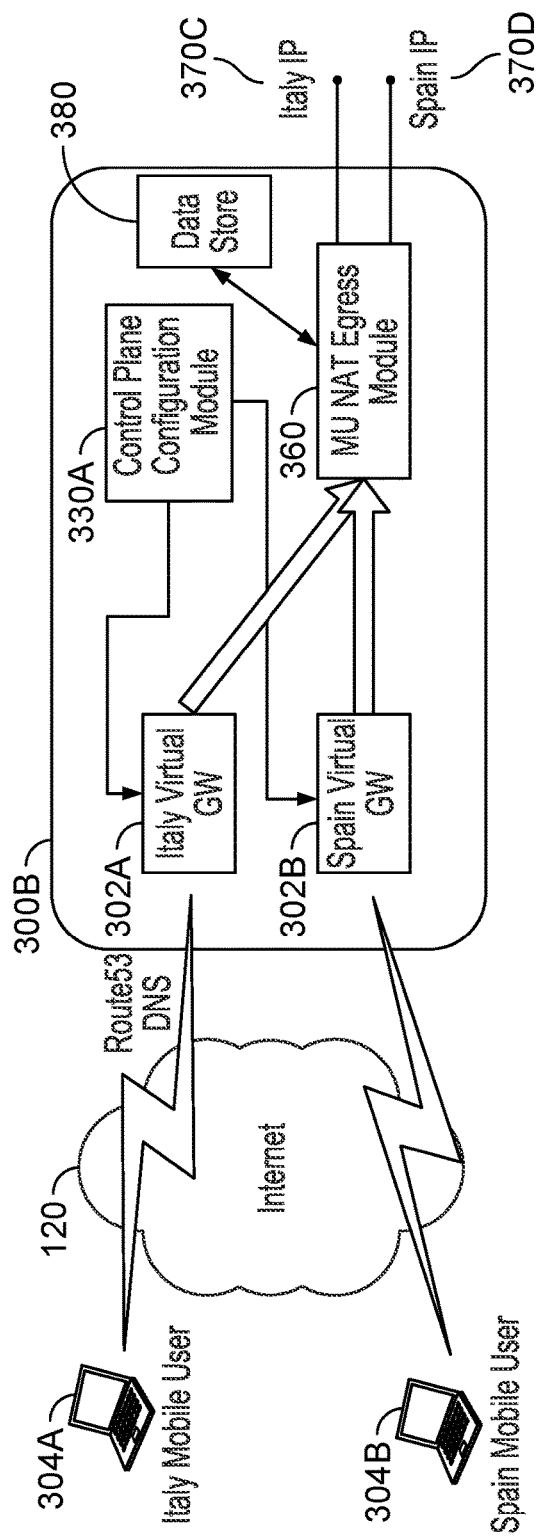

FIGS. 3A and 3B are system block diagrams that illustrate example components of a network gateway for providing localization at scale for a cloud-based security service in accordance with some embodiments. In an example implementation, a network gateway 300A and a network gateway 300B of the cloud-based security service provider can be implemented using a commercially available virtual gateway (e.g., using a security platform, such as a firewall that is commercially available from Palo Alto Networks, Inc.). For example, network gateway 202 of FIG. 2A and network gateways 202A-C of FIG. 2B can each be implemented as shown at 300A in FIG. 3A and 300B in FIG. 3B as will be described below.

In an example implementation, for mobile users, the cloud-based security service provides an agent (e.g., GlobalProtect application, which is commercially available from Palo Alto Networks, Inc., or another VPN client application can be similarly configured to perform the disclosed operations as described herein) that is deployed and executed on the endpoint device of users of enterprise customers (e.g., mobile users 304A and 304B of FIG. 3B) to automatically and securely connect the mobile user to a regional network gateway. In this example implementation, the cloud-based security service has more than 100 compute locations to accommodate worldwide deployments and provide a localized experience, and the cloud-based security service is configured to map each location to a compute location based on performance and latency.

Specifically, when a mobile user connects to a network gateway of the cloud-based security service provider, the agent performs the following selection process to determine to which gateway to connect. If the mobile user connects in a country that has a local network gateway of the cloud-based security service provider, then the mobile user connects to the network gateway in that location/region (e.g., country). More specifically, the cloud-based security service provider registers network domains for virtual gateways for each supported location/region (e.g., the cloud-based security service provider registers distinct network domains for an Italy virtual gateway (GW) 302A and for a Spain virtual GW 302B as shown in FIG. 3B). The mobile user connects to such registered domains for their local location/region (e.g., country). As shown in FIG. 3B as further described below, such virtual gateways may, in some cases, be executing on a network gateway that is located in a different location/region (e.g., a network gateway that is executing a Spain virtual gateway (GW) and an Italy virtual GW may actually be executed on a server on a GPC site that is located in Germany). Also, if there is more than one gateway in the country (e.g., network gateways 202B and 202C as shown in FIG. 2B), then the mobile user connects to the in-country network gateway that has the lowest latency (e.g., at the time of initiating a secure connection using an IPsec/VPN tunnel to the network gateway). In some cases, users can manually select additional network gateways from their agent (e.g., if network/security administrators have allowed the users to manually select such network gateways). For example, in some configurations, the enterprise customer can, for example, select locations in the cloud-based security service that function as cloud-based network gateways to secure their mobile users.

For remote networks, such as for a branch office in Italy and a branch office in Spain for an enterprise customer of the cloud-based security service, a network admin for the enterprise customer can configure distinct IPsec tunnels (e.g., VPN tunnels) for connecting each such remote network (RN) to one or more network gateways provided by the cloud-based security service provider (e.g., typically configuring them to select to one or more of the nearest located network gateways, and then further network gateway selection criteria can be latency/workload, etc. as similarly described above). The RNs that are configured with distinct IPsec tunnels to two or more network gateways provided by the cloud-based security service provider can also be configured to then select the network gateway that has the lowest latency (e.g., at the time of initiating a secure connection using an IPsec/VPN tunnel to the network gateway).

Referring to FIG. 3A, Italy office 306A is configured to connect via an IPsec/VPN tunnel 326A to Remote Network (RN) Ingress Module 340 of a network gateway 300A of the cloud-based security service. RN Ingress Module 340 is a software component of the virtual network gateway (e.g., implemented in the C programming language or another programming language can be used to implement this component) that performs ingress connection processing and packet inspection using a Control Plane Configuration Module 330A (e.g., implemented using the components of a security platform as similarly described below with respect to FIG. 4B) for security analysis and security policy enforcement (e.g., Control Plane Configuration Module 330A can perform deep packet inspection (DPI) by decoding packets to monitor flows/sessions, perform security policy enforcement, etc.).

Specifically, RN Ingress Module 340 and a Remote Network (RN) Egress Module 350 are configured to perform Source NAT (SNAT) processing operations at the network gateway for a Remote Network (RN). More specifically, RN Ingress Module 340 determines that IPsec tunnel 326A is configured by the enterprise customer to connect from Italy office 306A. In this example implementation, IPsec tunnel configuration information is stored in a Data Store 380 (e.g., when a tunnel is created for a branch office, it is associated with a zone based on the office location), in which a security management platform provides such IPsec configuration information for the enterprise customers of the cloud-based security service to the network gateways in the different regions/locations for the cloud-based security service (e.g., Panorama, which is a commercially available security management platform from Palo Alto Networks, Inc., or another commercially available security management platform can similarly be used to distribute such configuration data that can be stored locally in a table that includes a mapping of such IPsec tunnels to location/region/country zones). As a result, the RN Ingress Module associates any new flows (e.g., new sessions) connecting via IPsec tunnel 326A with the Italy zone (e.g., a new flow/session table stored in Data Store 380 can be updated to associate the determined location/region, in this case, the Italy zone, with the new flow/session so that the location data (Italy zone) is included in the meta data associated with that new flow/session). To complete the SNAT processing operations for the new flow/session (e.g., in which the SNAT processing operations determine the egress IP address based on the zone associated with the new flow/session), RN NAT Egress Module 350 selects/allocates an IP address from a pool of public IP addresses for Italy for that tenant to assign a new Italy-based public IP address as an egress IP address (e.g., an egress IP address generally refers to an IP address that the cloud-based security service uses for egress traffic to the Internet, such as for accessing a web site/(SaaS) service on the Internet) for the new flow/session as shown at 370A (e.g., public IP addresses by country/zone can be obtained by the cloud-based security service provider for each customer/tenant and then distributed to each network gateway for local storage, such as in Data Store 380). The above-described SNAT processing operations can similarly be performed for new flows/sessions connecting from the Spain office 306B via a distinct IPsec tunnel 326B to assign a new Spain-based public IP address as an egress IP address for the new flow/session as shown at 370B.

In some cases, the above-described zones for performing the SNAT processing operations to select an egress IP address can be based on a region within a country. As an example, an enterprise customer may have two remote network (RN) locations deployed in Canada: Central Canada and Eastern Canada. Both locations in this example map to the Canada compute location (e.g., a network gateway located in Canada). However, the Quebec Province in Canada uses a different default language (French) than other provinces in Canada (English). As such, the network gateway of the cloud-based security service is configured to assign sessions from these distinct RNs different egress IP addresses to achieve the desired locality user experience as similarly described above (e.g., the locations use different egress IP addresses to ensure that the user gets the correct default language for the region when connected to a web site/(SaaS) service).

Referring to FIG. 3B, each virtual gateway (GW), including Italy Virtual GW 302A and Spain Virtual GW 302B, is configured with a distinct registered domain name (e.g., Fully Qualified Domain Name (FQDN)/IP address). When an Italy Mobile User 304A attempts to connect to a network gateway 300B, the agent executing on the endpoint device of Italy Mobile User 304A initiates a network connection to the registered domain name (e.g., Fully Qualified Domain Name (FQDN)/IP address) associated with Italy Virtual GW 302A (e.g., as the agent is configured to initiate connections to the registered domain name, Fully Qualified Domain Name (FQDN), of the virtual gateway(s) available in the mobile user's current location). As a result, Italy Virtual GW 302A automatically determines that the incoming user's location is Italy and the meta data associated with the new flow/session for Italy Mobile User 304A can be stored in Data Store 380 as similarly described above. To complete the SNAT processing operations for the new flow/session (e.g., in which the SNAT processing operation determines the egress IP address based on the zone associated with the new flow/session), Mobile User (MU) NAT Egress Module 360 selects/allocates an IP address from a pool of public IP addresses for Italy for that tenant to assign a new Italy-based public IP address as an egress IP address for the new flow/session as shown at 370C as similarly described above (e.g., public IP addresses by country/zone can be obtained by the cloud-based security service provider for each customer/tenant and then distributed to each network gateway for local storage, such as in Data Store 380). The above-described SNAT processing operations can similarly be performed for new flows/sessions connecting from Spain Mobile User 304B via Spain Virtual GW 302B to assign a new Spain-based public IP address as an egress IP address for the new flow/session as shown at 370D.

In this example implementation, the network gateways of the cloud-based security service provider thereby efficiently and securely implement the disclosed techniques for enhanced user experience of locality for web sites/services by performing Source NAT (SNAT) processing operations on incoming user sessions that are connecting to sites outside of the user's enterprise network to access a web site/service on the Internet. Specifically, such user sessions are assigned an egress IP address that is associated with the location/region of the user's incoming session to the network gateway as opposed to an egress IP address that is assigned to the network gateway that may be located in a different location/region and/or that network gateway IP address is associated with a location/region that is distinct from the user's location/region as similarly described above. In this example implementation, the network gateway of the cloud-based security service provider (e.g., the PAN-OS operating system of Palo Alto Networks' firewalls) is configured to support the disclosed new SNAT capability (e.g., SNAT processing operations) for providing localization at scale for a cloud-based security service.

As similarly described above, in this example implementation, the cloud-based security service provider also maintains a set of IP address ranges for each of their supported locations/regions (e.g., PoPs) to use as a distinct public IP address pool for each customer/tenant of the cloud-based security service provider's service (e.g., as opposed to requiring that each of their customers provide, for example, hundreds of such public IP address ranges). Also, by maintaining such public IP address pools distinct for each customer/tenant, the cloud-based security service provider also facilitates a more secure solution for each of their customers (e.g., as opposed to having such a public IP address pool that is shared across distinct customers) as well as facilitating the localization at scale benefits of the disclosed techniques (e.g., by supporting such techniques at hundreds of PoPs). For example, customers can utilize the distinct public IP address pool to implement various security policies (e.g., ACME Company can allow user sessions connecting to their Salesforce® service to bypass multifactor authentication based on the assigned public IP address of the user sessions given that the cloud-based security service provider utilizes a public IP address pool that is distinct and only used for users associated with the ACME Company).

Figure 4A:
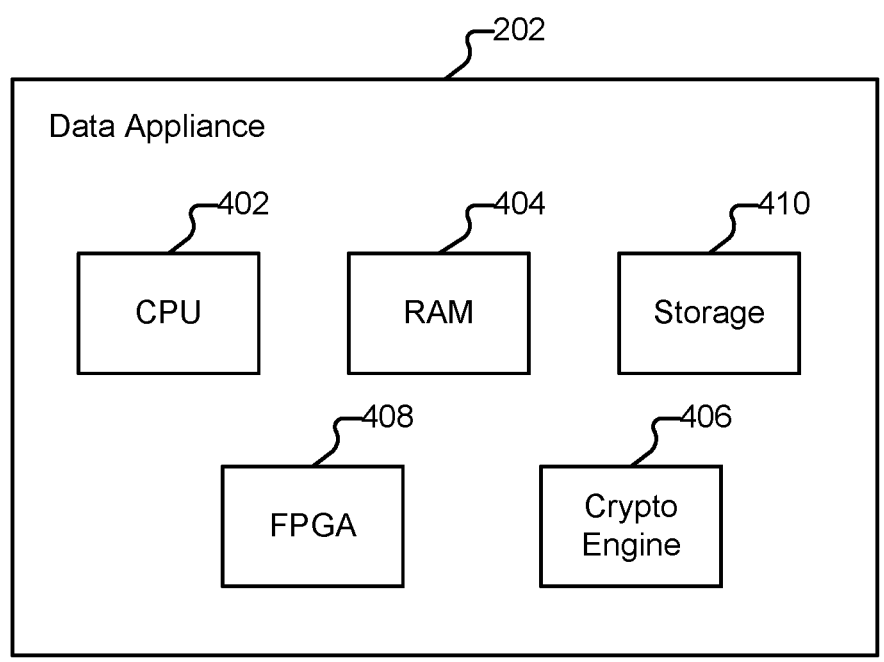
FIG. 4A illustrates an embodiment of a network gateway in accordance with some embodiments.

An embodiment of network gateway 202 is shown in FIG. 4A. The example shown is a representation of physical components that can be included in network gateway 202 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., client device 204A) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
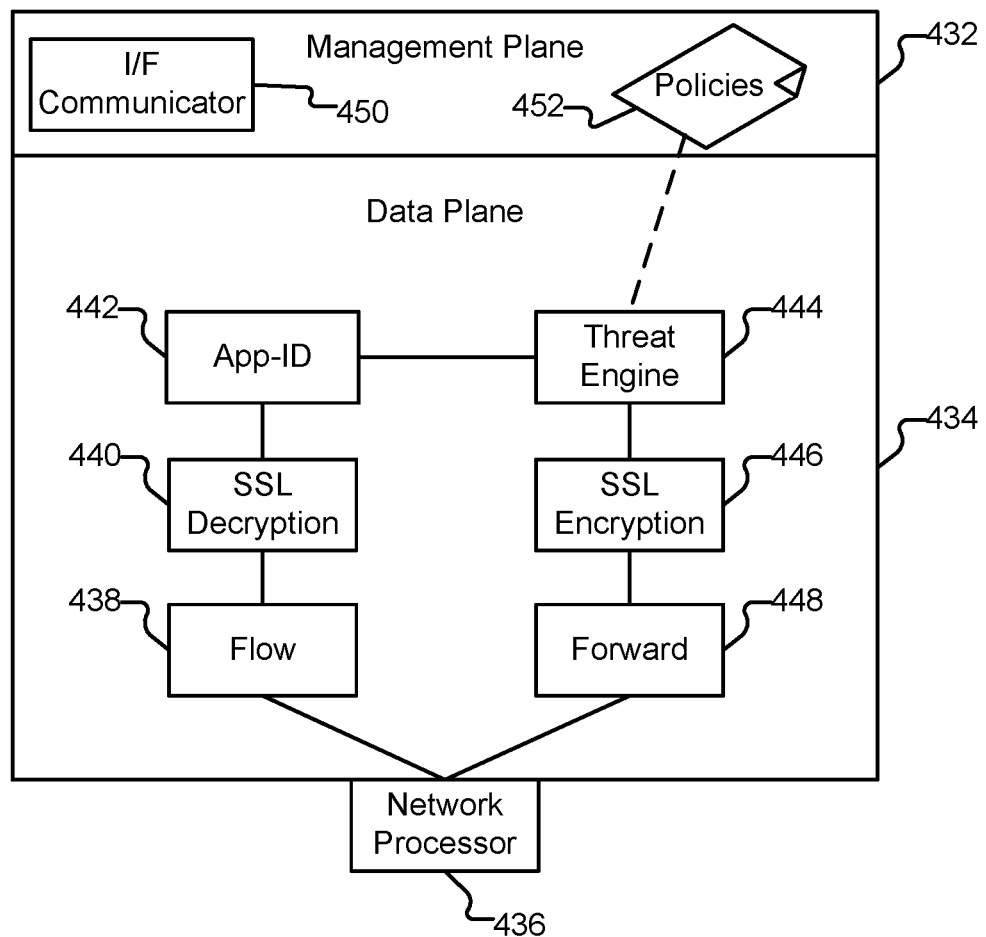
FIG. 4B is a functional diagram of logical components of an embodiment of a data appliance.

FIG. 4B is a functional diagram of logical components of an embodiment of a data appliance. The example shown is a representation of logical components that can be included in network gateway 202 in various embodiments. Unless otherwise specified, various logical components of network gateway 202 are generally implementable in a variety of ways, including as a set of one or more scripts (e.g., written in Java, python, etc., as applicable).

As shown, network gateway 202 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as client device 204, and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 202 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 202. For example a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Additional logical components/features can be included in this example embodiment. For example, the network gateway components described above with respect to FIGS. 3A-B (e.g., location-based virtual gateways such as shown at 302A and 302B, RN Ingress Module 340, RN NAT Egress Module 350, MU NAT Egress Module 360, and/or Data Store 380, etc.) can also be included in the data appliance in various embodiments.

Figure 5:
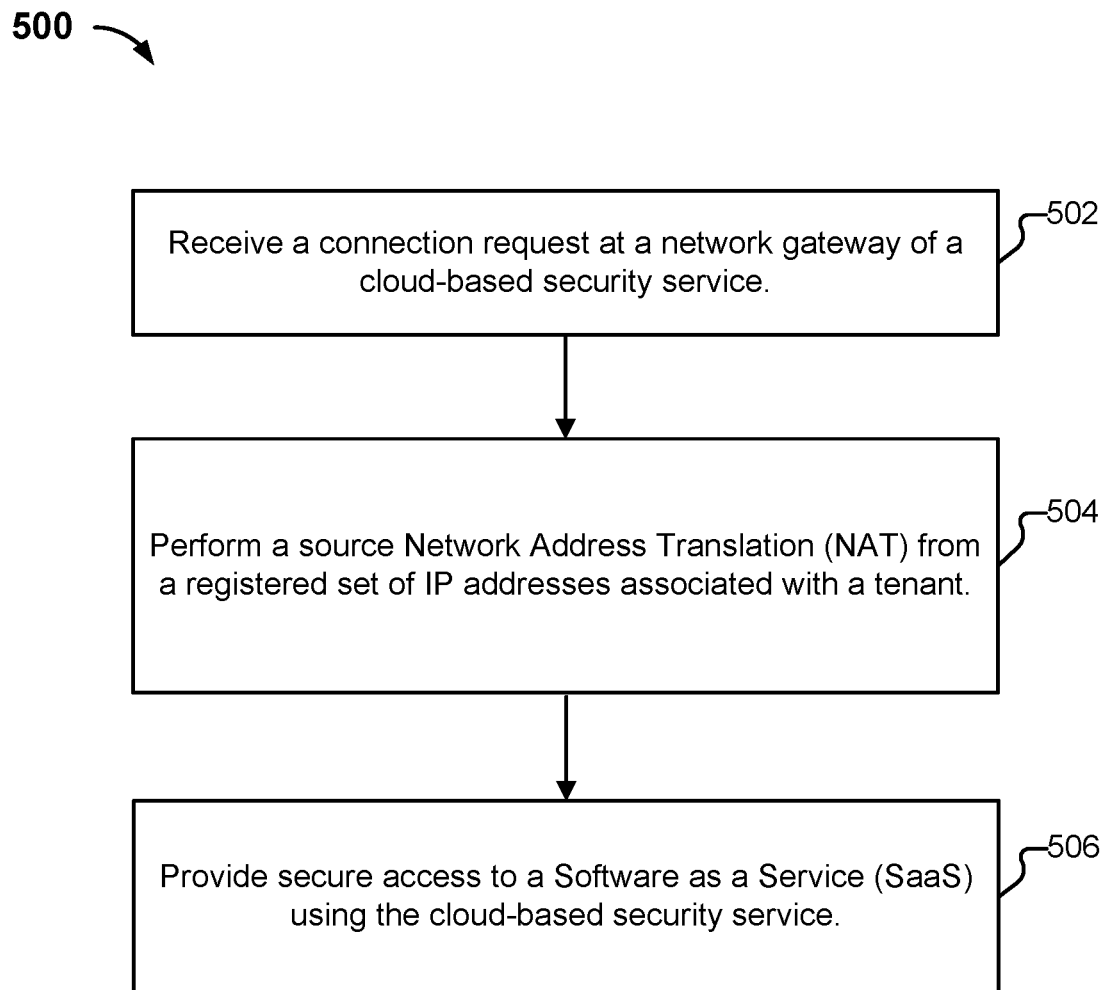
FIG. 5 is a flow diagram illustrating a process for providing localization at scale for a cloud-based security service in accordance with some embodiments.

Example Processes for Providing Localization at Scale for a Cloud-Based Security Service FIG. 5 is a flow diagram illustrating a process for providing localization at scale for a cloud-based security service in accordance with some embodiments. In one embodiment, process 500 is performed using the system architectures described above (e.g., such as described above with respect to FIGS. 1-4B).

The process begins at 502 where a connection request at a network gateway of a cloud-based security service is received. For example, the cloud-based security service can be provided using a public cloud service provider or using a combination of public cloud service providers as similarly described above.

At 504, a source Network Address Translation (NAT) from a registered set of public IP addresses associated with a tenant is performed. For example, the cloud-based security service can obtain a pool of registered IP addresses for each of its supported locations/regions for each customer/tenant of the cloud-based security service as similarly described above.

At 506, secure access to a Software as a Service (SaaS) using the cloud-based security service is provided. As such, the desired locality user experience as similarly described above is achieved for the user that accesses the SaaS using the cloud-based security service (e.g., the locations use different egress IP addresses to ensure that the user gets the correct default language for the location/region associated with the mobile user's location and/or the remote network/branch office as similarly described above).

Figure 6:
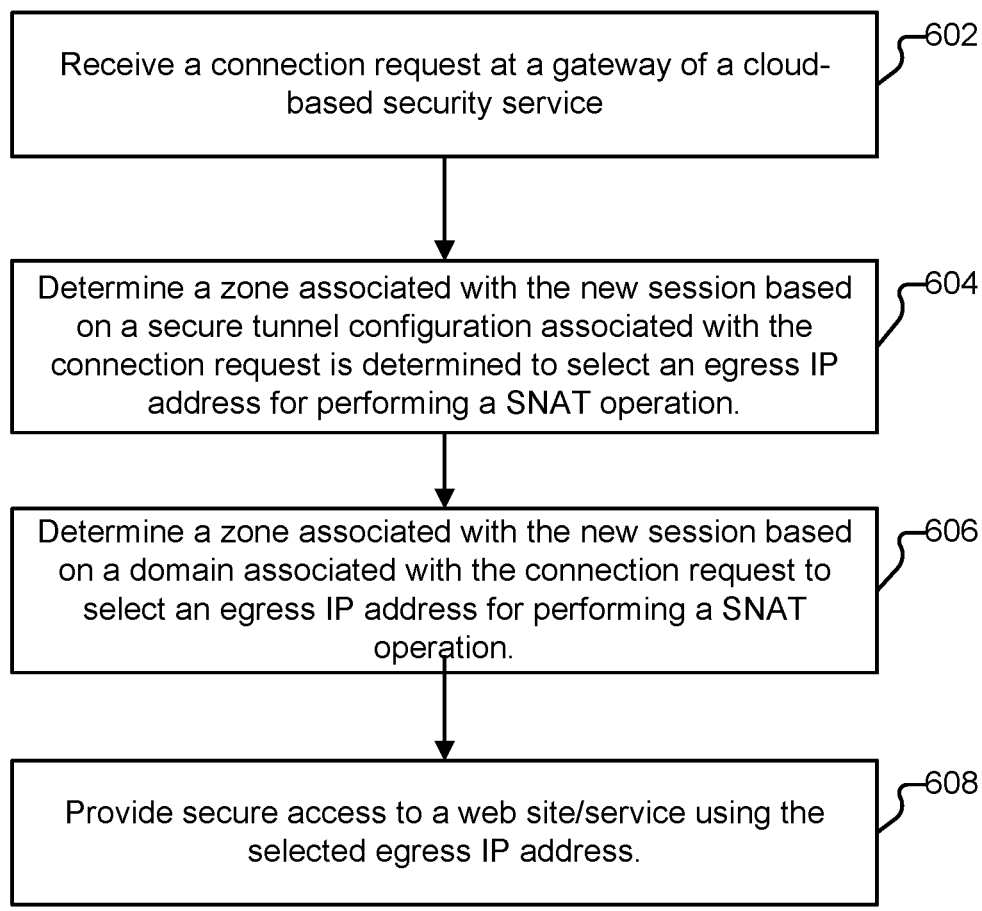
FIG. 6 is another flow diagram illustrating a process for providing localization at scale for a cloud-based security service in accordance with some embodiments.

FIG. 6 is another flow diagram illustrating a process for providing localization at scale for a cloud-based security service in accordance with some embodiments. In one embodiment, process 600 is performed using the system architectures described above (e.g., such as described above with respect to FIGS. 1-4B).

The process begins at 602 where a connection request at a network gateway of a cloud-based security service is received. In an example implementation, the cloud-based security service is provided using a public cloud service provider that provides high-speed network connectivity from each of their various regional cloud-based computing service data centers to one or more SaaS providers as similarly described above.

At 604, a zone associated with the new session based on a secure tunnel configuration associated with the connection request is determined to select an egress IP address for performing a Source Network Address Translation (SNAT) operation. For example, for new sessions from remote networks/branch offices connecting to the network gateway via a network domain request, the selected egress IP is associated with a zone (e.g., location/region) that corresponds to the zone of the secure tunnel to facilitate an enhanced user experience of locality for the user of the SaaS.

At 606, a zone associated with the new session based on a domain associated with the connection request is determined to select an egress IP address for performing a Source Network Address Translation (SNAT) operation. For example, for new sessions of mobile users connecting to the network gateway via a network domain request, the selected egress IP from the network gateway is associated with a zone (e.g., location/region) that corresponds to the zone of a user that sent the connection request to facilitate an enhanced user experience of locality for the user of the SaaS.

At 608, secure access to a web site/service using the selected egress IP address is provided. As such, the desired locality user experience as similarly described above is achieved for the user that accesses the web site/service using the cloud-based security service (e.g., the locations use different egress IP addresses to ensure that the user gets the correct default language for the location/region associated with the mobile user's location and/or the remote network/branch office as similarly described above).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
receive a connection request at a network gateway of a cloud-based security service;
perform a source Network Address Translation (NAT) from a registered set of public Internet Protocol (IP) addresses associated with a tenant, wherein an egress IP from the network gateway is associated with a region that corresponds to the region of a user that sent the connection request to facilitate an enhanced user experience of locality for a user of a Software as a Service (SaaS); and
provide secure access to a Software as a Service (SaaS) using the cloud-based security service, wherein the cloud-based security service maintains a set of IP address ranges for each of their supported regions to provide distinct public IP address pools for each customer of the cloud-based security service; and
a memory coupled to the processor and configured to provide the processor with instructions.

2. The system recited in claim 1, wherein a first customer configures a distinct security policy associated with the distinct public IP address pool associated with the first customer.

3. The system recited in claim 1, wherein the cloud-based security service is provided using a public cloud service provider.

4. The system recited in claim 1, wherein the cloud-based security service is provided using a plurality of public cloud service providers.

5. The system recited in claim 1, wherein the cloud-based security service is provided using a public cloud service provider that provides high-speed network connectivity from each of the public cloud service provider's various regional cloud-based computing service data centers to one or more SaaS providers.

6. The system recited in claim 1, wherein the network gateway enforces a security policy.

7. The system recited in claim 1, wherein the network gateway comprises a virtual firewall.

8. The system recited in claim 1, wherein the connection request is associated with a new session, and wherein the processor is further configured to:
determine a zone associated with the new session.

9. The system recited in claim 1, wherein the connection request is associated with a new session, and wherein the processor is further configured to:
determine a zone associated with the new session based on a secure tunnel configuration associated with the connection request.

10. The system recited in claim 1, wherein the connection request is associated with a new session, and wherein the processor is further configured to:
determine a zone associated with the new session based on a domain associated with the connection request.

11. A method of synchronizing a honey network configuration to reflect a target network environment, comprising:
receiving a connection request at a network gateway of a cloud-based security service;
performing a source Network Address Translation (NAT) from a registered set of public Internet Protocol (IP) addresses associated with a tenant, wherein an egress IP from the network gateway is associated with a region that corresponds to the region of a user that sent the connection request to facilitate an enhanced user experience of locality for a user of a Software as a Service (SaaS); and
providing secure access to a Software as a Service (SaaS) using the cloud-based security service, wherein the cloud-based security service maintains a set of IP address ranges for each of their supported regions to provide distinct public IP address pools for each customer of the cloud-based security service.

12. The method of claim 11, wherein a first customer configures a distinct security policy associated with the distinct public IP address pool associated with the first customer.

13. The method of claim 11, wherein the cloud-based security service is provided using a public cloud service provider.

14. The method of claim 11, wherein the cloud-based security service is provided using a plurality of public cloud service providers.

15. The method of claim 11, wherein the cloud-based security service is provided using a public cloud service provider that provides high-speed network connectivity from each of the public cloud service provider's various regional cloud-based computing service data centers to one or more SaaS providers.

16. A computer program product, the computer program product being embodied in a non-transitory computer readable storage medium and comprising computer instructions for:
receiving a connection request at a network gateway of a cloud-based security service;
performing a source Network Address Translation (NAT) from a registered set of public Internet Protocol (IP)

addresses associated with a tenant, wherein an egress IP from the network gateway is associated with a region that corresponds to the region of a user that sent the connection request to facilitate an enhanced user experience of locality for a user of a Software as a Service (SaaS); and providing secure access to a Software as a Service (SaaS) using the cloud-based security service, wherein the cloud-based security service maintains a set of IP address ranges for each of their supported regions to provide distinct public IP address pools for each customer of the cloud-based security service.

17. The computer program product recited in claim 16, wherein a first customer configures a distinct security policy associated with the distinct public IP address pool associated with the first customer.

18. The computer program product recited in claim 16, wherein the cloud-based security service is provided using a public cloud service provider.

19. The computer program product recited in claim 16, wherein the cloud-based security service is provided using a plurality of public cloud service providers.

20. The computer program product recited in claim 16, wherein the cloud-based security service is provided using a public cloud service provider that provides high-speed network connectivity from each of the public cloud service provider's various regional cloud-based computing service data centers to one or more SaaS providers.

* * * * *